Figure 1:
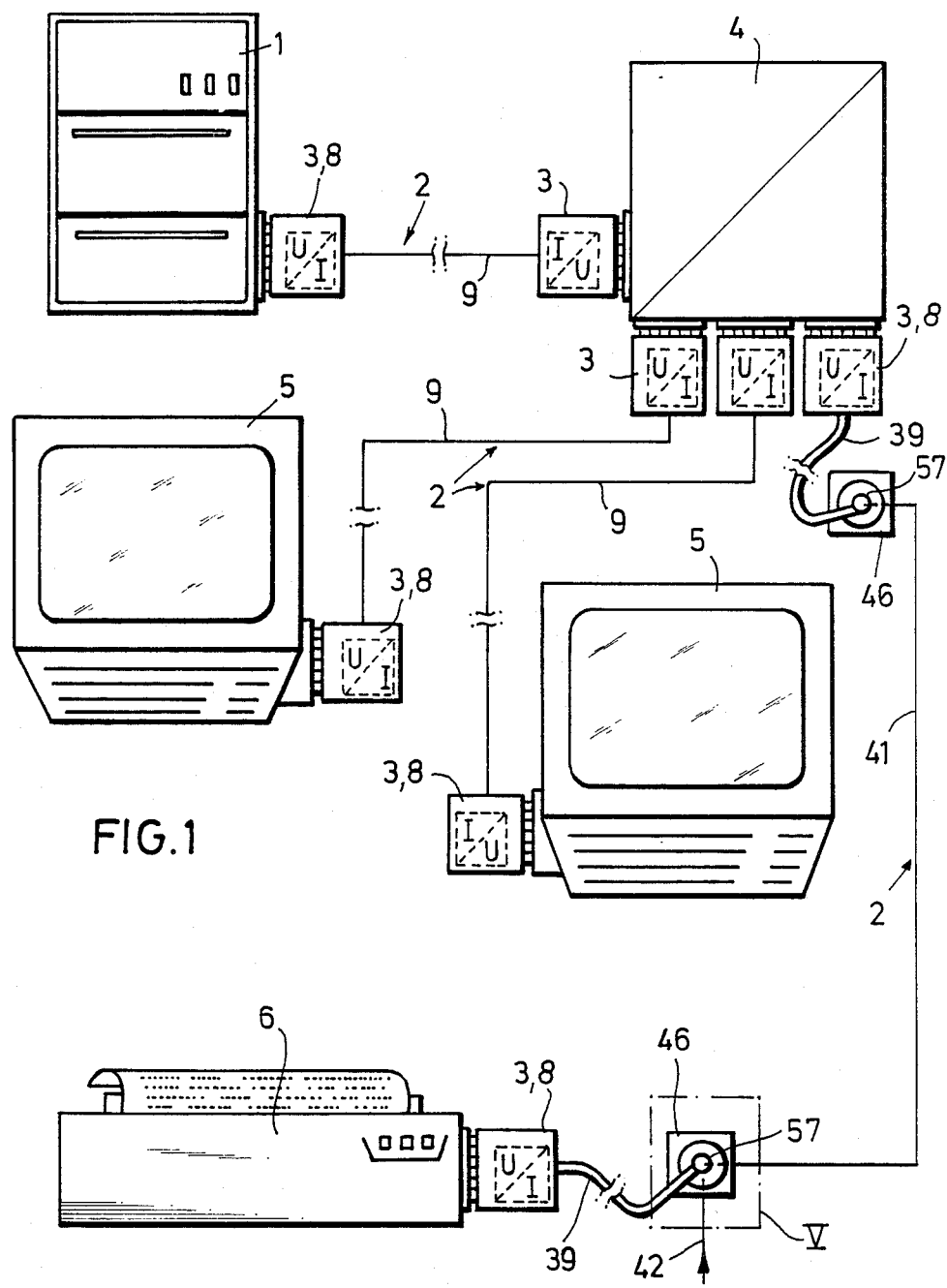

United States Patent [19]

Stecker

[11] Patent Number: 4,760,375
[45] Date of Patent: Jul. 26, 1988

[54] DATA TRANSMISSION CABLE

[76] Inventor: Josef Stecker, Gustav-Cords-Strasse 7, D-5000 Köln 60, Fed. Rep. of Germany

[21] Appl. No.: 665,104

[22] Filed: Oct. 26, 1984

[30] Foreign Application Priority Data

Oct. 28, 1983 [DE] Fed. Rep. of Germany ... 8331081[U]
Dec. 16, 1983 [DE] Fed. Rep. of Germany ... 8336080[U]

[51] Int. Cl.⁴ .......................................... H04M 11/04
[52] U.S. Cl. ........................ 340/310 A; 340/310 CP; 174/52 PE; 361/395; 363/73; 363/146; 363/147; 439/59; 439/76; 439/461
[58] Field of Search .................... 340/310 A, 310 CP; 363/146, 147, 73; 339/107, 208, 193 P, 17 C, 17 L, 17 LC, 218 R, 218 M; 361/395, 399, 389; 174/52 PE; 439/59, 68, 76, 461, 683, 687, 724, 734; 455/343

[56] References Cited

U.S. PATENT DOCUMENTS

| | | | |
|---|---|---|---|
| 3,170,749 | 2/1965 | Johanson et al. | 339/107 |
| 3,678,366 | 7/1972 | Tharman | 363/146 |
| 3,900,769 | 8/1975 | Russo | 361/395 |
| 4,153,873 | 5/1979 | Grindheim | 361/283 |
| 4,305,633 | 12/1981 | Engberg et al. | 339/17 LC |
| 4,306,760 | 12/1981 | Testa | 339/107 |
| 4,403,111 | 9/1983 | Kelly | 178/63 R |
| 4,409,641 | 10/1983 | Jakob et al. | 339/17 LC |
| 4,543,624 | 9/1985 | Rumble | 363/146 |

OTHER PUBLICATIONS

AMF Incorporated, Electronic Products Magazine, Mar. 18, 1974, p. 36.

Primary Examiner—John W. Caldwell, Sr.
Assistant Examiner—Tyrone Queen
Attorney, Agent, or Firm—Spensley Horn Jubas & Lubitz

[57] ABSTRACT

A multi-wire data transmission cable for transmitting data signals over long distances between data devices. Presently, data devices are usually equipped with voltage interfaces for the connection of peripheral instruments. The length of data transmission lines connecting such devices is limited, due to line resistances. For transmission over long distances, signals must be converted prior to transmission and then must be reconverted after receipt of transmission. The present invention allows the connection of long transmission lines to data devices without the need of external signal converters or additional units normally required. The handle portion of the plug connection at either or both ends of the cable houses a circuit that incorporates a signal converter. No additional external units are required to connect data devices over long distances, since the converter is integrated into the cable.

11 Claims, 3 Drawing Sheets

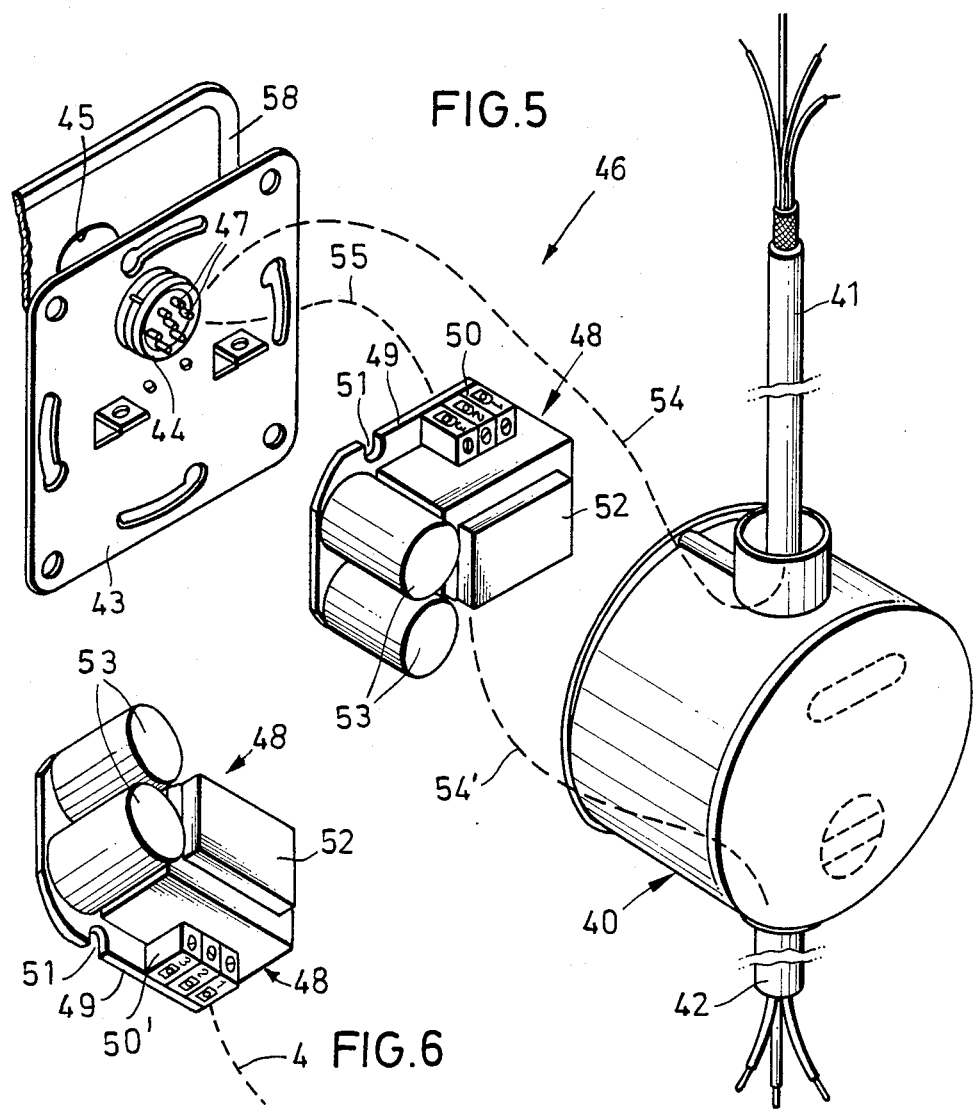
FIG.5
FIG.6
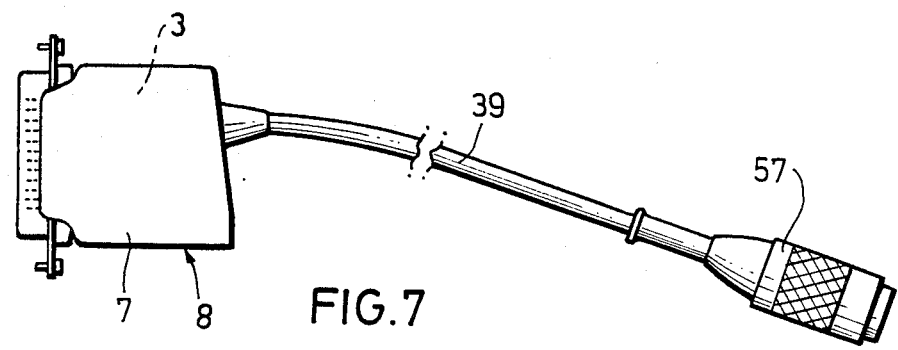
FIG.7

DATA TRANSMISSION CABLE

The invention relates to a multi-wire transmission cable for transmitting data signals over long distances between data devices comprising at least one multiple-plug connection of a first plug member which includes a handle portion and a contact bar and in which terminates the end of the transmission line, and a second apparatus-side plug member.

According to existing standards, data devices are usually equipped with voltage interfaces for the connection of peripheral instruments. Due to the line resistances, said voltage interfaces for the data transmission only admit a maximum line length of about 15 m for the connection of other data devices such as terminals, printers and other peripheral instruments. Therefore, to permit to connect data devices over long distances up to many kilometers, the digital voltage signals, prior to being fed into the transmission lines, are converted by a converter at the voltage interfaces into current signals which may be easily transmitted over long distances and which are substantially less sensitive to electric malfunction. A second converter at the receiving data device reconverts the current signals into voltage signals. Thus, for a bilateral data communication, one converter each is to be connected at the respective interfaces for both directions of transmission.

There have been known converter circuits which are subsequently incorporated in data devices. However, the expenditure involved with the mounting for the subsequent incorporation into existing apparatuses is considerable. For instance with the use of data devices from different manufacturers and being compatible with the interfaces, the mounting is to be effected by different after-sales technicians. If the devices to be equipped with converters have been obtained by leasing, it is frequently unallowable to operate with the data units. In such a case, or if a data device cannot be refitted for other reasons, external units must be used which are mounted in specific housings and which have a current supply of their own. Further, to set up such external devices, additional space and an additional line voltage supply are imperative. In view of the high expenditure involved with an external converter assembly, such a device usually includes several converters for a plurality of data transmission channels. For the reasons explained above, data units to be connected to said converter cannot be set up farther away than 15 m. However, this is inhibitive for the desire of supplying computer services with data instruments positioned far away from one another.

It is the object of the invention to provide a data transmission cable of the above mentioned type which allows to connect long transmission lines to data devices without the need of changing said data device or of using specific additional units.

According to the invention, the posed problem is solved in that the handle portion of the multiple plug connection houses a circuit support which carries a voltage/current converter.

No additional external units are required to connect data units over long distances with the use of such a data transmission cable because the converter is integrated in the cable. Thus, additional plug connections normally necessary between converter and data unit and between converter and transmission cable which might cause additional failures during the data transmission are excluded. With the use of the cable of the invention, data units may be interconnected by simple means and at low cost over long distances either in decentralised or in star mounting. By providing the converter in the handle member current may be supplied directly thereto via the plug connection from the data unit.

According to an advantageous embodiment of the invention, the circuit support is equipped bilaterally with components. A circuit support equipped this way is highly integrated additionally to permit to fit it also in smaller plug units.

Preferably, the underside of the circuit support is adapted to mount all of the passive components of the converter while the active elements and the plug contact pairs are secured to the upper side. As a result thereof, all of the flat components are secured to the underside of the circuit support, while elements which are higher, are combined on the top of the circuit support thus optimizing the utilisation of the space available between the handle cups of the handle member.

Further, soldering points for the transmission line are provided nearly centrally on the upper side of the circuit support. By this means, due to the central positioning of the connecting contacts, the transmission line may be easily connected to the converter.

According to another embodiment of the invention, the circuit support takes up two voltage/current converters for the bidirectional data communication.

One converter each preferably occupies one half in the longitudinal direction of the circuit support.

The circuit support may be embedded in a sealing compound adapted to the cavity of the handle member. Thus, the converter is protected against mechanical damage and a better heat dissipation in the handle cup is ensured at the same time.

The sealing compound may comprise a recess to receive the end of the transmission line thus facilitating the connection of the latter to the converter and permitting to support a cable traction protection at the handle member.

The handle member may also consist of two cups of which one is provided with seat faces for the circuit support to improve its safe seating so as to avoid line interruptions by excessive elongation of the circuit support due to deformation of the plug portion.

Moreover, the other handle cup contains bores to pass therethrough LED diodes visible from the outside which are secured to the circuit support and project therefrom. In case of operation of a converter, the LED-diode belonging to the respective converter, is illuminated to show that the data transmission may be checked optically from the outside.

The current supply required for the data transmission converter is direct current. In sore cases, such a current supply for the data transmission coverter to be connected is provided already in the data device. In a great number of other data devices, such a current supply may not be provided and, as a rule, they cannot be refitted subsequently to this effect.

It is another object of the invention to provide a connecting means by which separate units and lines for the current supply to data transmission converters may be spared.

Therefore, the invention provides a connecting means to connect a data transmission cable to the connecting line of a data processing unit comprising an installation socket to be mounted on or in a wall and closed by a plate which carries a multipole plug member connectible to the data transmission cable, the installation socket including a mains unit which has a circuit support on which a transformer and at least one capacitor are integrally mounted.

According to the invention the mains supply unit required for the current supply to the data transmission converter is mounted in an installation socket in which ends the data transmission cable and to the plug member of which the connecting cable of the device will be connected. According to the invention, said installation socket which had been used only previously in view of the data transmission cable, serves also for the housing of the mains supply unit. The mains supply is fed to the latter by means of a cable ending in the installation socket and the direct current supply to the data transmission converter is realised by the multi-wire cable also serving for the transmission of data. In other words, the data transmission converter is connected through one sole cable to the installation socket and through another cable to the data device. By this means, a simple and clear wiring is possible, thus avoiding errors and line confusions during the connection. In the connecting means of the invention, the data lines and supply lines leading to the data converter extend via a common cable from one sole installation socket. On the part of the wall, the data transmission cable and a mains cable end in the installation socket.

According to an advantageous embodiment of the invention, the circuit support together with its mounted electric components is embedded in a sealing compound which forms a flat support body for the transformer. The small-sized circuit members such as rectifier diodes, anti-interference capacitors etc. may be provided in the flat support body where they are encapsulated completely to be protected from contact and humidity. The larger components, i.e. the transformer and at least one capacitor project from the support body, the bottom surfaces of said larger components including the connecting legs being enclosed sealingly by the support body material so that no wires or connecting legs of the circuit of the mains unit are unprotected although the main unit is not totally sealed. Due to the mentioned design of the main unit, its space requirement is reduced to a minimum which is determined by the used larger components. Such a small-sized mains unit may be readily housed in an installation socket such as used for electric installations, and sufficient space for including different wires to be connected is available for all that.

The edge of the support body may have at least two recesses for the fixation at a holding surface. Although the mains unit may be introduced loosely into the installation socket, it might be advisable to care for a fixation. To this effect, the recesses in the support body serve for fixing by screws or other fixing elements the mains unit at the holding surface.

The circuit support or the support body may include clamping elements to connect the mains unit with poles of the plug element. To this end, one respective group of clamping elements is arranged on two parallel sides of the transformer at the circuit support or the support body, while two upright capacitors mounted parallel to one another are fitted at a transformer side extending transversely to the support body. Due to such a coordination of the mentioned elements in mutually spaced relationship, the resultant compact and small-sized unit is particularly adapted to the space conditions of installation sockets.

One embodiment of the invention will be explained hereunder in more details with reference to the drawings.

Figure 2:
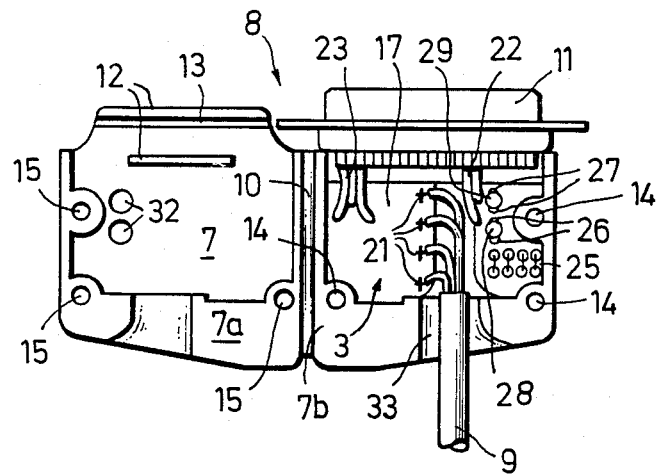
Figure 3A:
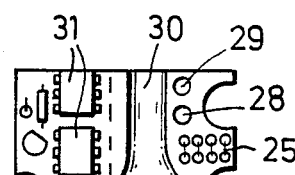
Figure 3B:
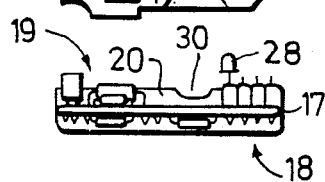
Figure 3C:
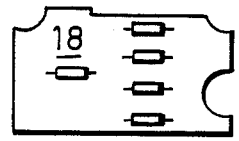
Figure 4:
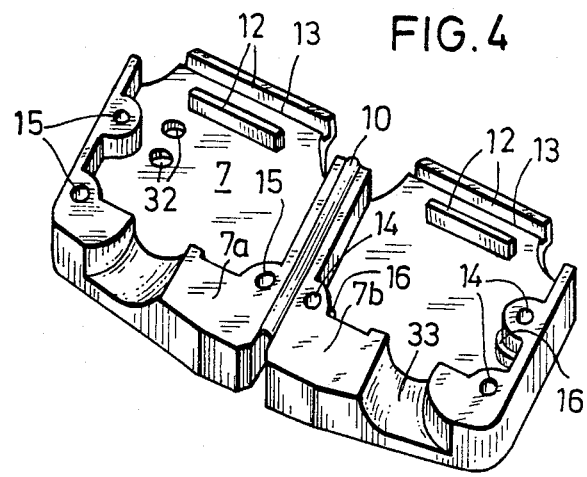

FIG. 1 is a data processing system comprising data devices set up remotely from one another and being connected by a respective data transmission cable, FIG. 2 shows a cable-side plug member comprising a handle portion, incorporated bidrectional converters, and the connected end of the transmission line, FIGS. 3,a,b,c illustrate a plan view, a side view and a view from below of a circuit support with converter elements embedded in a sealing compound, FIG. 4 is a perspective view of a handle portion inside, FIG. 5 is an exploded view of the connecting means V of FIG. 1, FIG. 6 is a perspective view of a mains supply unit of the connecting means of FIG. 6 seen from another direction, FIG. 7 is a view of the data transmission cable which is connected to the connecting means of FIG. 5.

The data processor illustrated schematically in FIG. 1 comprises a central computer 1 connected via data transmission cable 2 to remotely mounted components of the data processing system, the data transmission cables 2 being able to transmit data signals over distances of up to 5 km and comprising at both their ends a respective converter 3 for each transmission direction which is operative as voltage/current converter or as current/voltage converter. For instance digital voltage signals supplied from the computer 1 are converted into current signals at the interface by the converter 3 at the computer-sided end of the data transmission cable 2, while they are reconverted at the other end of the data transmission cable 2 into voltage signals which are supplied to a multiplexer 4 which, by further data transmission cables 2, is connected to respective converters 3 at two remotely mounted terminals 5 and a printer 6.

The converters contained in the data transmission cable 2 are provided in a handle member 7 or a cable-sided first plug element 8, the ends of the transmission lines 9 ending in the handle members 7. A second device-bound plug element is mounted in the respective data device and forms the point of intersection on behalf of the device.

In the embodiment of FIG. 1, the two terminals 5 are connected to the multiplexer 4 by flexible data transmission cables 9 the ends each of which contain a plug element 8 with a handle member 7 housing the circuit of a converter 3. Current is supplied to the two converters at the ends of cables 9 by the terminal 5. However, in the illustrated embodiment, printer 6 is not adapted to the current supply of the connected data line 39,41,39. The data line comprises two connecting means 46 which are interconnected by a data transmission cable 41 mounted in a room wall and of which one connecting means 46 is joined via a flexible data transmission cable 39 to the printer 6, the other connecting means being joined to the multiplexer 4 via a flexible data transmission cable 39. One of the two connecting means 46 is enabled by a mains cable 42 in a manner still to be explained hereunder.

The handle member 7 shown in FIG. 2 is an element of a standardized 25-pole subminiature-D-plug. The handle member 7 comprises two handle cup halves adjoined by hinges via a film hinge 10 and the outer walls of which, in folded condition, surround a cavity which houses a 25-pole contact bar 11, the converter 3 and the end of the transmission line 9. The cavity is open at the device-sided face of the handle member 7 to receive the contact bar 11. At the opposite side, the handle member 7 contains a substantially round hole 33 serving for the passage of the transmission line 9.

The construction of both handle cups 7a, 7b of the handle member 7 is substantially mirror-symmetrical relative to the axis of the film hinge 10. To receive the contact bar 11, two substantially parallel bars 12 and a groove 13 adjacent inwardly to the outer bar extend vertically to the film hinge. If the handle member 7 is closed, the two handle cups 7a, 7b positively enclose the contact bar 11, the bars 12 and the groove 13 taking up tensile and pressure stresses exerted during the introduction and removal of the plug connection.

In folded condition, the two handle cups 7a, 7b are interconnected firmly by three screws extending through bores 14 in the handle cup 7b and being screwed in handle cup 7a in respectively provided smaller pocket holes 15. Not only bore 14, but also the pocket holes 15 are surrounded by cylindrical walls which, together with the edges of the outer walls of the handle cups 7a,7b form the seating and support face of the latter. The cylindrical walls of both the bores 14 positioned oppositely in diagonal direction according to FIG. 2 are provided with a step 16 which may serve as a seat for the circuit support 17 thus avoiding contacting of the components mounted at the underside 18 of the circuit support with the wall of handle cup 7b extending in parallel to the circuit support 17 if the latter is introduced into the cavity half formed by handle cup 7b. To insert the circuit support 17, its outer dimensions are adapted to the profile of the cavity in the cutting plane between the two handle cups 7a,7b. Therefore, the circuit support 17 may be inserted as far as to the steps 16 of the cylindrical wall 14.

In view of the mechanical protection of the constructional components, of the reinforcement of the circuit support 17 and of the improved heat dissipation between the handle cups 7a,7b, the converter 3 may be embedded in a sealing compound 20 which fills substantially the cavity half surrounded by the handle cup 7b. The upper edge of the sealing compound 20 ends with the cutting plane between the two handle cups 7a,7b. Beside the terminal contacts 21 provided nearly centrally on the circuit support 17, the sealing compound 20 contains a channel-type recess 30 whose one extremity ends in the aperture 33 for the transmission line 9. The recess 30 is meant to receive the end of the transmission line 9 and to inhibit a probable squeezing of individual lines when the handle cups 7a,7b are screwed together.

In closed condition of the handle member 7, the cavity confined by the handle cup 7a receives one half of the contact bar 11, on the one hand, and the components projecting beyond the sealing compound as well as the end of the transmission line 9, on the other hand. As mentioned, the connecting contacts 21 for the transmission line 9 are situated nearly centrally on the upper side 19 of the circuit support 17. However, they project from the sealing compound 20 thus permitting to fix thereto by soldering the individual wires of the transmission line. Left-hand of the connecting contacts 21 according to FIG. 3, two optocouplers 31 arranged side by side and in parallel to the connecting contacts 21 are turned relative to one another by 180°.

On the right half of the circuit support 17 according to FIG. 2, two lines 22 are shown which are soldered to the contact bar 11 to supply current to the converter via the data device. Three lines 23 extend from the left-hand corner of the circuit support 17 as evident also from FIG. 2. They are soldered to plug contacts of the contact bar 11 to transmit the data signals. In the right hand portion of the circuit support 17 of FIG. 2, several plug contact pairs 25,26,27 are seen which project out of the sealing compound. In bridging the individual contacts, plug contacts 25 are used to adjust the mode of operation of the two converters fitted on the circuit support 17. As for plug contact pairs 26 and 27, they receive a respective insertable LED diode 28,29 which indicate the data communication by a converter, the LED diodes 28,29 protruding from the circuit support 17 to extend through bores 32 in the handle cup 7a, when the handle member is folded so that they slightly project from the external top face of the handle cup 7a.

By means of a transmission cable 2 having at both its ends multiple plug connections with the disclosed converter 3, it is possible to interconnect by simple means data units over long distances in that the cable-side plug portion with the handle member containing the converter is plugged into the respective apparatussided plug element. Thus, the interface of the apparatus is connected to the respective converters which are joined to the current supply of the data unit. No additional device need be connected. If, for some reason or other, current cannot be supplied from the data device, it is possible to care for an external current supply or for a current supply from the data device at the other end of the transmission cable.

A connecting means 46 of FIG. 1 will be now explained hereunder with reference to FIGS. 5 to 7.

A data transmission cable 41 which, in a manner known per se comprises a number of cores being enclosed by a shield and a cable sheathing extends into a cylindrical installation socket 40 optional designed as a concealed or non-concealed member, the cable being conducted through a peripherally provided wall-sided opening. From the other side, an aperture in the peripheral wall of the wall socket 40 receives the triple-core mains cable 42.

The front opening of the wall socket 40 is closed by a plate 43 containing a number of holes and brackets. In one opening of the plate 43 a cylindrical plug part 44 is mounted whose rearward surface wiring is shown in the drawing. The front side of the plug part 44 forms a bushing extending through an opening 45 of the front shield covering plate 43, the cover shield 58 being fixed by (non-illustrated) screws at plate 43 which by connecting means usual in electrotechnics but not shown in detail in the instant case, may be attached at the front opening of the installation socket 40. Preferably, another mains plug-socket from which extends the mains line 42 is provided in the close vicinity of the installation socket 40. If so, a common cover shield 58 may be provided for both installation sockets by fixing it at the (nonillustrated) mains wall socket in order to carry plate 43 which, as a result thereof, is borne by the cover shield designed as a double shield. Thus, a direct fixation of the plate 43 on the wall socket 40 is not required.

The wall socket 40 houses the mains unit 48 which comprises a plate-shaped support body 49 having one exposed side, while from its other side, the transformer 52 sealed in a block and two cylindrical smoothing capacitors 53 project in upright position, the latter being provided closely side by side on the support body 49 at the front side of the transformer 52.

Along the two opposite broad sides of the transformer 52, one group each of clamping elements 50,50' is mounted on the support body 49 in the form of screwing clamps in which cable cores may be clamped in making contact.

The support body 49 contains a (non-illustrated) circuit support to which the small-sized components of the mains unit 48 are secured, e.g. rectifier diodes, anti-interference diodes and anti-interference capacitors. Said components together with the circuit support are sealed in synthetic resin forming the support body 49, said casting resin of the support body 49 also enclosing the base ranges of the transformer 52 and of the smoothing capacitors 53 so that the respective connecting lines of said elements directly extending from the undersides into the support body 49 are completely covered and protected.

The width of the support body 49 corresponds to the sum of widths of the transformer 52 and of the clamping elements 50. Outside the range of the clamping elements 50 a free strip of the support body 49 is provided with recesses 51 to fix it at a holding surface by means of screws or the like.

Inside the installation socket 40 along the dash line 54 the cores of the data transmission cable 41 are connected by means of some connecting pins 47. The cores of the mains cable 42 are connected to the primary clamping elements of the transformer 52 along the dash line 54', while the secondary clamping elements 50 are connected along line 55 with the other pins 47 the plug part 44. Thus,the cable 39 to be connected from the outside to the plug portion 44 contains signal lines as well as supply lines.

To the connecting means 46 illustrated in FIG. 5, the data transmission cable 39 of FIG. 7 is joined in that the multi-pole round plug 57 fastened to one end of the data transmission cable 39 is passed through the opening 45 into the plug part 44.

The other end of the flexible data transmission cable 39 is provided with the plug member 8 containing converter 3 and being connected to the printer 6 or to another data device.

The disclosed connecting means allows to connect a data unit e.g. an input and/or output terminal to a remotely installed computer for the exchange of data between data device and computer, the current supply for the data transmission converter set up in the course of the connecting line being fitted inside the installation socket through which the data line of the data device is connected to the data transmission line 41.

What is claimed is:

1. A multi-wire data transmission cable, having a first end and a second end, for transmitting data signals between data devices having voltage interfaces, said cable comprising:
    a multi-wire cable;
    a plug connection member located at each end of the cable, said plug connection member having a handle portion and a contact bar in which the cable terminates and being adapted to be connected to the voltage interfaces of said data devices;
    a circuit support housed in each handle portion,
    the circuit support at the first end including a voltage/current converter for converting voltage signals from said data devices to current signals transmissible via said cable, and
    the circuit support at the second end including a current/voltage converter for converting current signals from said data transmission cable to voltage signals transmissible to said voltage interfaces of said data devices,
    the circuit support of the first end further including a current/voltage converter for converting current signals from said data transmission cable to voltage signals transmissible to said voltage interfaces of said data devices, and
    the circuit support of the second end further including a voltage/current converter for converting voltage signals from said data devices to current signals transmissible via said cable,
    whereby said data signals are transmitted between said data devices in the form of current signals.

2. The multi-wire data transmission cable of claim 1 wherein at least one circuit support is embedded in a sealing compound which is adapted to fit entirely inside the handle portion of the plug connection member and which includes a recess for receiving the end of the multi-wire cable.

3. The multi-wire data transmission cable according to claim 1 wherein the circuit support further comprises a first section and a second section.

4. The multi-wire data transmission cable according to claim 3 further comprising plug contact pairs mounted on the second section of the circuit support.

5. The multi-wire data transmission cable according to claim 1 further comprising connecting contacts for the transmission line, said connecting contacts being located approximately centrally on the upper side of the circuit support of the voltage/current converter.

6. The multi-wire data transmission cable according to claim 1 wherein at least one of the handle portions has a cavity therein and further comprising a sealing compound adapted to fit within the cavity, said circuit support being embedded in the sealing compound.

7. The multi-wire data transmission cable according to claim 6 wherein the sealing compound includes a recess therein adapted to receive a portion of the multi-wire cable.

8. The multi-wire data transmission cable according to claim 7 wherein the recess in the sealing compound extends transversely to the contact bar.

9. The multi-wire data transmission cable according to claim 1 wherein at least one of the handle portions comprises two handle cups, at least one of the handle cups having steps which serve as seat faces for the circuit support.

10. The multi-wire data tranmission cable according to claim 9 wherein at least one of said handle cups contains bores therein, and further comprising light emitting diodes, said light emitting diodes being secured to the circuit support, said light emitting diodes being disposed to emit light through the bores of the handle cup, whereby light emitted by the light emitting diodes is visible through the handle portion.

11. The multi-wire data transmission cable according to claim 1 wherein at least one of said circuit supports is connected to at least one of said plug connection members.

* * * * *